H. EISLER

HAIR DEVICE

Dec. 20, 1932. Re. 18,695

Original Filed July 8, 1931

INVENTOR.

Henry Eisler

BY

ATTORNEY.

Reissued Dec. 20, 1932

Re. 18,695

UNITED STATES PATENT OFFICE

HENRY EISLER, OF NEW YORK, N. Y., ASSIGNOR TO EMETH FINANCIAL CORPORATION, A CORPORATION OF NEW YORK

HAIR DEVICE

Original No. 1,844,644, dated February 9, 1932, Serial No. 549,339, filed July 8, 1931. Application for reissue filed September 30, 1932. Serial No. 635,697.

This invention relates to hair devices for use particularly with short or bobbed hair.

One of the objects of the invention is to provide a simple and easily manipulated device for forming and supporting the hair in a roll, puff or bun.

Another object is to provide a device of extremely flexible construction so that it may be readily bent to conform to the curvature of the neck or head and thus give the rolled hair a very natural appearance.

Various other objects and advantages of the invention will be apparent from the following description thereof.

The improved device, generally speaking, comprises a pair of flexible members between which the hair may be engaged and upon which it may be wound into a roll, said device having pliable end portions or members adapted to be bent inwardly to fasten the roll and to secure the device in place in the hair.

While the device is intended primarily for use on the natural hair it may also be used in connection with transformations, and it may be subject to various modifications in construction without departing from the spirit or scope of the invention.

The invention is illustrated in the accompanying drawing, in which.

Figure 1:
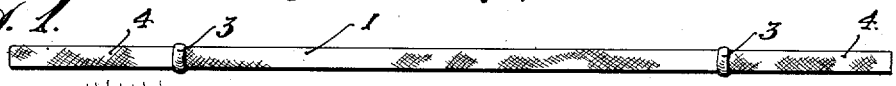
Figure 1 is a front view of the device.
Figure 2:
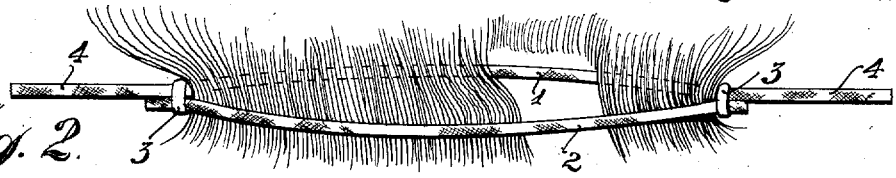
Fig. 2 is a plan view showing the flexible members spread apart for insertion of the hair.
Figure 3:
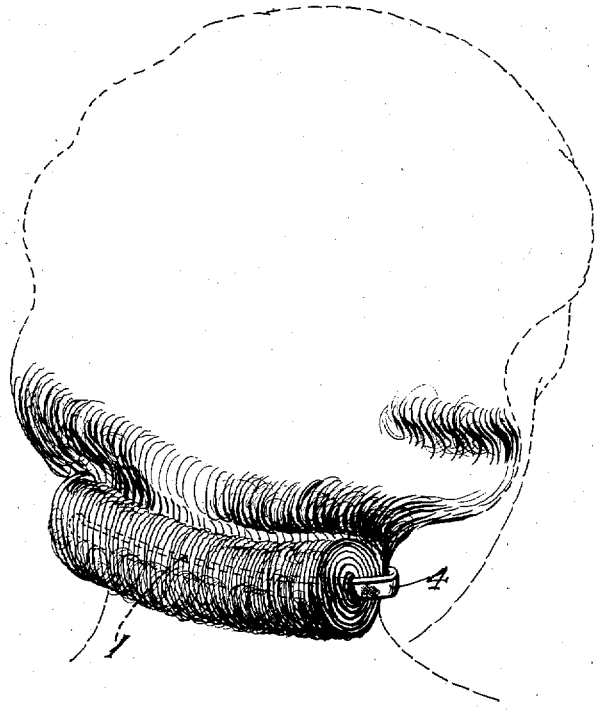
Fig. 3 is a view showing the device worn in the hair.

The device, in its preferred embodiment as shown in Figures 1 and 2, comprises a pair of flexible members 1 and 2, one longer than the other, and fixedly connected together as at 3 by any suitable fastening means. The members 1 and 2 are preferably made of covered flexible wire, although they may be made of uncovered flexible material, and are adapted to be spread apart as indicated in Figure 2 to receive the ends of the hair. After the hair has been inserted between said members, they are squeezed or pressed together to clamp the hair and are rolled axially to wind up the hair into a roll, puff or bun as shown in Figure 3. The flexible or pliable end portions or members 4 are then bent inwardly towards and in back of the neck so as to fasten the roll and firmly secure the device in the hair. For the sake of clearness, the bent ends 4 are exposed in Figure 3, but it will be understood that when the device is worn in the hair, these ends will be substantially covered by loose portions of the hair so as to render the device practically invisible.

The device is light in weight so that it may be worn comfortably in the hair and is of highly flexible construction to permit of its being readily bent lengthwise to conform to the curvature of the neck or head so as to give the roll a very natural appearance. To allow for bending without buckling, the member 2 is preferably slightly longer between the fastening points 3 than is the companion member 1. This construction compensates for the differences in radii of the two members when arched to the curvature of the neck.

Figure 4:
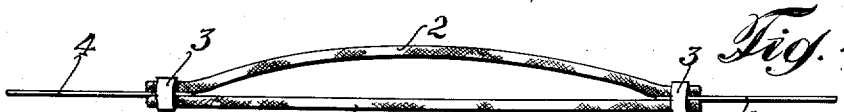
Fig. 4 is a plan view of the modification.

In the form of the device illustrated in Figures 1 and 2, the pliable ends 4 are integral parts of the flexible member 1 whereas in the modification shown in Figure 4 separate flat pliable extension strips 4 are clamped in between and fastened to the ends of the flexible members 1 and 2.

Figure 5:
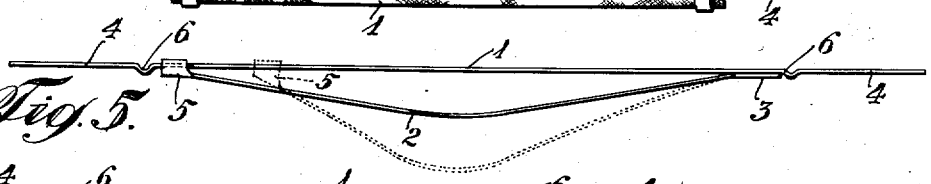
Fig. 5 is a plan view of another modification, and, Fig. 6 is a similar view of a further modification.

The modification shown in Figure 5 is made of relatively thin flat flexible strips. In this form one end of the member 2 is fixed as at 3 to the member 1, while the other end is slidably mounted thereon by means of a sleeve or sliding connection 5. This construction permits of relative movement of the members in bending and enables them to be easily spread apart, as indicated by the dotted lines, for reception of the hair. In this modification the flexible or pliable end portions 4 are preferably provided with preformed bends 6 to facilitate bending of the ends in fastening the device in the hair.

Figure 6:
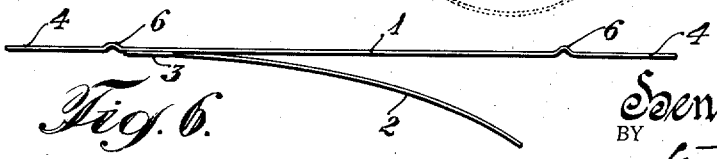

Figure 6 shows a further modification in which only one end of the member 2 is fixed to the member 1. With a device of this form, the hair is inserted between the members and the free end of member 2 is pressed and held against member 1 while the hair is being wound into a roll. One advantage of this form, in comparison with those previously described, is that it may be removed without first unrolling the hair and consequently can be used as a curler in addition to its use for both forming and supporting the roll.

What I claim is:—

1. A device for forming hair in a roll comprising two flexible members, one longer than the other, the shorter member being permanently and rigidly fixed at both ends to the longer member intermediate the ends of said longer member to provide pliable projecting end portions on said longer member, said flexible members being adapted to be spread apart for insertion of the hair, to be pressed together to clamp the hair, and to be turned axially to wind the hair into a roll, and said pliable end portions being adapted to be bent inwardly and under to fasten the roll and to secure the device in place.

2. A device for forming hair in a roll comprising two flexible metallic members permanently and rigidly connected together at two spaced points, said members being adapted to engage the hair in between said spaced points and to be turned axially as a unit to wind the hair into a roll, and pliable metallic end members fixed to said flexible members adjacent their points of connection, said pliable end members being adapted to be bent inwardly and under to fasten the roll and to secure the device in place.

3. A device for forming hair in a roll comprising two flexible metallic members permanently and rigidly connected together at two spaced points, one of said members being slightly longer between said points than the other to permit of curving the device lengthwise without buckling said members, said members being adapted to engage the hair in between the spaced points and to be turned axially as a unit to wind the hair into a roll, and pliable metallic end members fixed to said flexible members adjacent their points of connection, said pliable end members being adapted to be bent inwardly and under to fasten the roll and to secure the device in place.

4. A device for forming hair in a roll, including two pliable members of unequal length, and means to permanently and rigidly connect each of the ends of the shorter member to the longer member at spaced distances from the ends of the longer member to thereby cause the ends of the longer member to afford pliable projections, said connecting means each also providing points about which the pliable projections of the longer member are bendable so as to extend inwardly to fasten the roll and to secure the device in position, said members being of such degree of pliability so as to enable same to be spread apart for insertion of the hair.

5. A device for forming hair in a roll, comprising two flexible wire members permanently and rigidly connected together at two spaced points, said flexible wire members being adapted to engage the hair in between the spaced points and to be turned axially as a unit to wind the hair into a roll, and pliable metallic portions projecting outwardly beyond the points of connection, said pliable projecting portions being adapted to be bent inwardly and under to fasten the roll and to secure the device in place.

6. A device for forming hair in a roll, comprising upper and lower flexible wire portions connected together at two spaced points along the length of said portions, said flexible wire portions being adapted to engage the hair in between said portions and to be turned axially as a unit to wind the hair thereon, and pliable wire portions projecting outwardly beyond the points of connection, said pliable projecting portions being adapted to be bent inwardly and under to fasten the roll and to secure the device in place.

HENRY EISLER.